United States Patent
Mutter et al.

(10) Patent No.: US 11,677,581 B2
(45) Date of Patent: Jun. 13, 2023

(54) SUBSCRIBER STATION FOR A SERIAL BUS SYSTEM AND METHOD FOR COMMUNICATING IN A SERIAL BUS SYSTEM

(71) Applicant: Robert Bosch GmbH, Suttgart (DE)

(72) Inventors: Arthur Mutter, Neuhausen (DE); Florian Hartwich, Reutlingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 29 days.

(21) Appl. No.: 17/595,417

(22) PCT Filed: May 22, 2020

(86) PCT No.: PCT/EP2020/064310
§ 371 (c)(1),
(2) Date: Nov. 16, 2021

(87) PCT Pub. No.: WO2020/234465
PCT Pub. Date: Nov. 26, 2020

(65) Prior Publication Data
US 2022/0209983 A1 Jun. 30, 2022

(30) Foreign Application Priority Data
May 23, 2019 (DE) .......................... 102019207542.8

(51) Int. Cl.
*H04L 12/40* (2006.01)
*H04L 12/28* (2006.01)

(52) U.S. Cl.
CPC .... *H04L 12/40013* (2013.01); *H04L 12/2876* (2013.01); *H04L 12/40019* (2013.01);
(Continued)

(58) Field of Classification Search
CPC ... H04L 12/40; H04L 12/28; H04L 12/40013; H04L 12/40019
See application file for complete search history.

(56) References Cited

U.S. PATENT DOCUMENTS 11,489,694 B2 * 11/2022 Mutter ............. H04L 12/40097
2014/0337549 A1 11/2014 Hartwich et al.
(Continued)

FOREIGN PATENT DOCUMENTS

| CN | 103503382 A | 1/2014 |
|---|---|---|
| CN | 104620542 A | 5/2015 |

(Continued)

OTHER PUBLICATIONS

ISO 11898-1:2016 Standard, 2016, pp. 1-40.
(Continued)

*Primary Examiner* — Henry Tsai
*Assistant Examiner* — Christopher A Daley
(74) *Attorney, Agent, or Firm* — Norton Rose Fulbright US LLP; Gerard Messina

(57) ABSTRACT

A subscriber station for a serial bus system and a method for communicating in a serial bus system. The subscriber station includes a communication control device for controlling a communication of the subscriber station with at least one other subscriber station of the bus system, a transmitting/receiving device for receiving a transmission signal generated by a communication control device of a subscriber station of the bus system in a frame from a bus of the bus system and for generating a reception signal from the received frame, and a connection quality block for detecting and evaluating a quality of a communication connection to a subscriber station of the bus system from the reception signal generated by the transmitting/receiving device by (Continued)

using at least two time quanta, into which the bit time of a bit of the generated reception signal is subdivided.

15 Claims, 8 Drawing Sheets

(52) U.S. Cl.
CPC .............. *H04L 2012/40215* (2013.01); *H04L 2012/40273* (2013.01)

(56) References Cited

U.S. PATENT DOCUMENTS

| | | | |
|---|---|---|---|
| 2014/0351359 A1 | 11/2014 | Grocutt et al. | |
| 2016/0020952 A1 | 1/2016 | Berke et al. | |
| 2022/0052875 A1* | 2/2022 | Hartwich | H04L 12/40026 |

FOREIGN PATENT DOCUMENTS

| | | |
|---|---|---|
| CN | 104871505 A | 8/2015 |
| CN | 105515893 A | 4/2016 |

OTHER PUBLICATIONS

International Search Report for PCT/EP2020/064310 dated Aug. 10, 2020.
ISO 11898-1:2015 Standard, 2015, pp. 1-74.

* cited by examiner

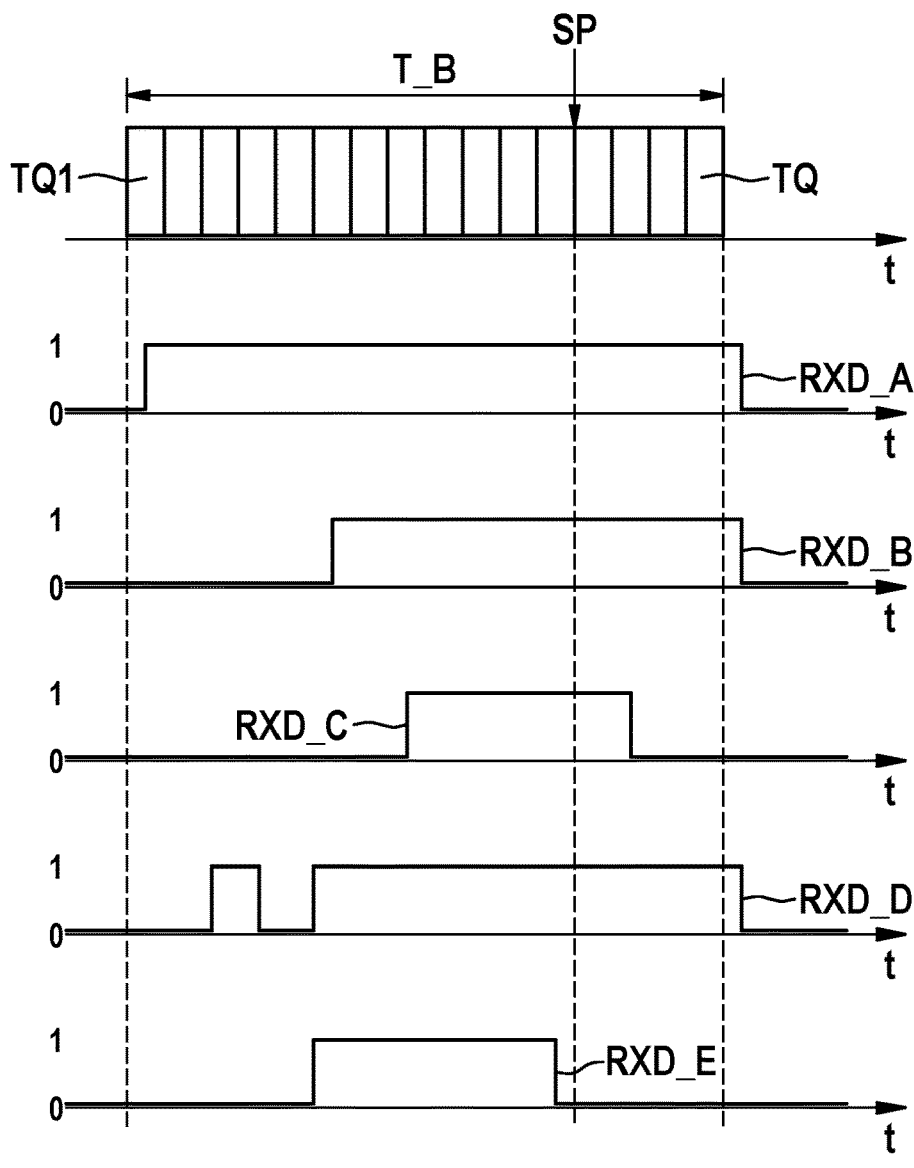
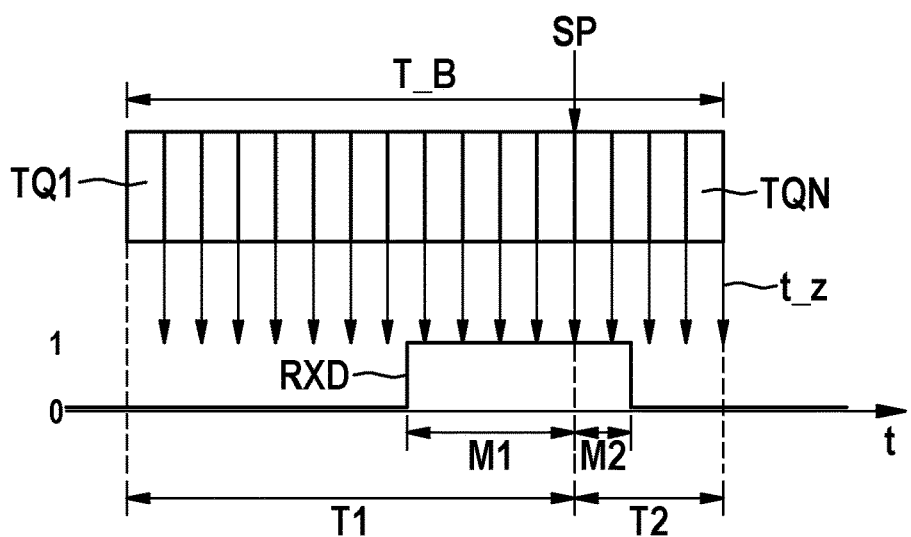

SUBSCRIBER STATION FOR A SERIAL BUS SYSTEM AND METHOD FOR COMMUNICATING IN A SERIAL BUS SYSTEM

FIELD

The present invention relates to a subscriber station for a serial bus system and to a method for communicating in a serial bus system, by which the subscriber station is able to evaluate its connection quality to or in the bus system and is able, if necessary, to take measures for improving the connection quality.

BACKGROUND INFORMATION

For communication between sensors and control units, for example in vehicles, a bus system is used ever more frequently, instead of a point-to-point connection, for reasons of costs, data being transmitted in the bus system as messages by CAN FD in the ISO 11898-1:2015 standard as the CAN protocol specification. The messages are transmitted between the subscriber stations of the bus system such as sensors, control units, transmitters, etc. Currently, CAN FD is used in the introductory phase in the first step usually at a data bit rate of 2 MBit/s in the transmission of bits of the data field and at an arbitration bit rate of 500 kbit/s in the transmission of bits of the arbitration field in the vehicle.

In the further development of CAN, however, higher bit rates and larger data fields within a message are to be possible than in CAN FD. For this purpose, a new CAN protocol is developed, which from this point on is called CAN XL. Apart from the pure data transport, CAN XL is also to support other functions such as safety (functional safety), security (data security) and QoS (quality of service), e.g., a guarantee of a maximum latency for a frame, time synchronization of the subscriber stations).

For autonomously driving vehicles, which are currently being developed by automobile manufacturers, the functional safety is a particularly important characteristic. One factor in this connection is to ensure the instantaneous quality of a communication connection. If, for example, the quality of a communication connection deteriorates to such a degree that this connection could fail, then the vehicle is to be able to take measures in timely fashion in order to anticipate a failure of the communication connection by using an alternative communication path for example, and if at all possible to prevent the failure by visiting a workshop for example.

Consideration was given to determining the connection quality by evaluating the number of erroneous frames per unit of time. For this purpose, separate error counters for transmitted and received frames could be used in the CAN controller, which are then evaluated. The disadvantage of a solution of this kind is that many erroneous frames must first be counted in order to recognize a very imminent failure of the communication connection. Erroneous frames mean that the connection quality is so bad that errors already occur. However, then there remains hardly any time or no time at all for responding, so that the failure of the communication connection possibly can no longer be prevented.

SUMMARY

It is an object of the present invention to provide a subscriber station for a serial bus system and a method for communicating in a serial bus system, which may resolve the aforementioned problems. In particular, a subscriber station for a serial bus system and a method for communicating in a serial bus system are to be provided, which make it possible in the event of an imminent failure or deterioration of a communication connection to initiate measures for maintaining the communication in such timely fashion that the required functional safety of the communication may be ensured.

The object may be attained by a subscriber station for a serial bus system having the features of the present invention. In accordance with an example embodiment of the present invention, the subscriber station has a communication control device for controlling a communication of the subscriber station with at least one other subscriber station of the bus system, a transmitting/receiving device for receiving a transmission signal generated by a communication control device of a subscriber station of the bus system in a frame from a bus of the bus system and for generating a reception signal from the received frame, and a connection quality block for recording and evaluating a quality of a communication connection to a subscriber station of the bus system from the reception signal generated by the transmitting/receiving device by using at least two time quanta, into which the bit time of a bit of the generated reception signal is subdivided.

Using the subscriber station, it is possible to evaluate the connection quality very reliably. In this case, a deterioration of the connection quality may be detected very early, so that an imminent failure of a communication connection may be averted very reliably by initiating suitable measures. The subscriber station ensures that measures for maintaining the communication may be initiated in timely fashion so that the required functional safety of the communication may be guaranteed.

In the subscriber station, the ascertainment of the connection quality may be implemented digitally, for example in the protocol controller of the communication control device. A cost intensive analog evaluation of the bus signals is not required for this purpose. The subscriber station thus makes ascertaining the connection quality possible in a very cost-effective manner.

In the simplest case, the subscriber station requires only one counter and a configured threshold or a predetermined limit count value, which is compared to the count value of the counter. For more precise information, it is possible to use more than one counter and/or to ascertain the connection quality for each communication relation separately or individually. In this case, the connection quality is evaluated in a receiving subscriber station separately for each communication relation, that is, per transmitting subscriber station. This also comprises the connection quality when the subscriber station is the transmitter of the message and receives its own frame from the bus.

Consequently, the subscriber station makes it possible to implement a transmission and reception of the messages at a high safety level.

Advantageous further developments of the subscriber station are disclosed herein.

It is possible that the connection quality block is designed to be adjustable as to whether an evaluation of a quality of a communication connection is to be performed for every bit or only for dedicated bits of the generated reception signal.

According to a special variant of an embodiment of the present invention, the connection quality block comprises a counting module having at least one counter for counting the at least two time quanta between edges of the bit or for counting time quanta of the at least two time quanta when at least one predetermined property of the time quantum is present, and an evaluation module for evaluating the quality of the communication connection on the basis of the result of the count value of the at least one counter in comparison to at least one predetermined limit count value. For this purpose, the at least one predetermined property of the time quantum may comprise a value of the bit in the time quantum and/or a position of the time quantum relative to a sample point of the bit and/or the number of the time quanta and/or the clock pulse of the time quanta and/or be the information that the time quantum is the first time quantum of the bit or the last time quantum of the bit.

The communication control device is possibly designed to provide the connection quality block with the at least one predetermined property of the time quantum.

According to a variant of the present invention, the connection quality block is designed to detect and evaluate the bit asymmetry of a bit of the generated reception signal by using at least one time quantum prior to a sample point of the bit and at least one time quantum following the sample point of the bit.

According to a variant of the present invention, the connection quality block has at least one first counter for counting at at least two times during a bit time whether the bit of the reception signal has a first binary value, and at least one second counter for counting at at least two times during a bit time whether the bit of the reception signal has a second binary value, which differs from the first binary value, the connection quality block being designed to evaluate the quality of the communication connection on the basis of the result of the count values of the first and second counters in comparison to at least one predetermined limit count value.

According to one exemplary embodiment of the present invention, the connection quality block has a first counter for detecting during a bit time of the bit of the reception signal at at least one time prior to a sample point of the bit, whether the bit has the first binary value, and for counting, if the bit has the first binary value; a second counter for detecting during a bit time of the bit of the reception signal at at least one time prior to the sample point of the bit, whether the bit has the second binary value, and for counting, if the bit has the second binary value; a third counter for detecting during a bit time of the bit of the reception signal at at least one time after the sample point, whether the bit has the first binary value, and for counting, if the bit has the first binary value; a fourth counter for detecting during a bit time of the bit of the reception signal at at least one time after the sample point, whether the bit has the second binary value, and for counting, if the bit has the second binary value, the connection quality block being designed to evaluate the quality of the communication connection on the basis of the result of the count values of the first through fourth counter in comparison to at least one predetermined limit count value.

According to one exemplary embodiment of the present invention, in the case of the existence of a bit asymmetry of bit of the generated reception signal, the connection quality block is designed to shift the position of the sample point of bits of the reception signal generated by the transmitting/receiving device in such a way that the sample point lies in the middle between the edges of the bit.

The connection quality block is possibly designed to detect the double-switchovers or multi-switchovers during a bit of the generated reception signal.

Additionally or alternatively, it is possible that the communication control device is designed to provide the connection quality block with an identifier of the frame, the connection quality block being designed to provide the quality of the communication connection individually for at least two subscriber stations of the bus system.

In one development of the present invention, the subscriber station may also have a signal distortion block for predistorting the transmission signal generated by the communication control device and/or for postdistorting the reception signal.

The communication control device is optionally designed to partition the frame into a first communication phase and a second communication phase, and it being negotiated in the first communication phase, which of the subscriber stations of the bus is granted in the subsequent second communication phase an at least temporarily exclusive, collision-free access to the bus, and the connection quality block being designed to perform a detection and evaluation of the connection quality as a function of the current communication phase.

At least two of the subscriber stations described above may be part of a bus system, which additionally comprises a bus, the at least two subscriber stations being connected to one another via the bus in such a way that they are able to communicate serially with one another.

The aforementioned object may be additionally achieved by a method for communicating in a serial bus system in accordance with the present invention. In accordance with an example embodiment of the present invention, the method is carried out by a subscriber station of the bus system, which has a communication control device and a transmitting/receiving device, the method comprising the steps of receiving, using a transmitting/receiving device, a transmission signal generated by a communication control device of a subscriber station of the bus system in a frame from a bus of the bus system, and generating, using the transmitting/receiving device, a reception signal from the received frame, and detecting and evaluating, using a connection quality block, a quality of a communication connection to a subscriber station of the bus system from the reception signal generated by the transmitting/receiving device by using at least two time quanta, into which the bit time of a bit of the generated reception signal is subdivided.

The method offers the same advantages as were mentioned above with reference to the subscriber station.

Additional possible implementations of the present invention also include combinations of features or specific embodiments not explicitly mentioned above or below with regard to the exemplary embodiments. One skilled in the art will also add individual aspects as improvements or supplementations to the respective basic form of the present invention, in view of the disclosure herein.

BRIEF DESCRIPTION OF THE DRAWINGS

The present invention is described in more detail below with reference to the figures and on the basis of exemplary embodiments.

FIG. 4 shows a timing diagram illustrating the view of a receiving subscriber station in the bus system according to the first exemplary embodiment, which sees different signal characteristics in accordance with FIGS. 5 through 9 at the terminal of an RXD signal.

FIGS. 5-9 show different signal characters of an RXD signal.

FIG. 10 shows a timing diagram illustrating the principle of operation of a connection quality block of the receiving subscriber station in the bus system according to the first exemplary embodiment.

Unless indicated otherwise, identical or functionally equivalent elements are provided with the same reference characters in the figures.

DETAILED DESCRIPTION OF EXAMPLE EMBODIMENTS

Figure 1:
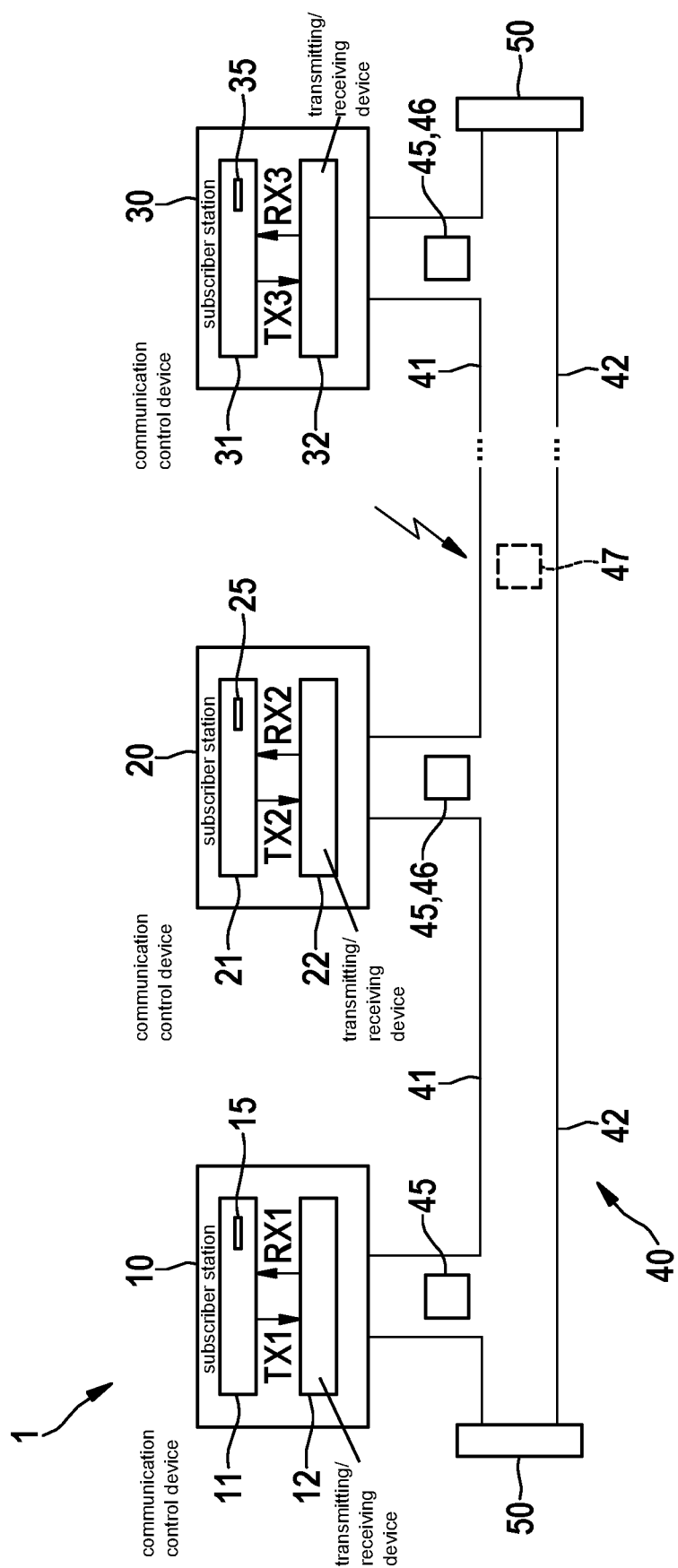
FIG. 1 shows a simplified block diagram of a bus system according to a first exemplary embodiment of the present invention.

FIG. 1 shows as an example a bus system 1, which is fundamentally developed in particular as a CAN bus system and/or a CAN FD bus system and/or a CAN FD successor bus system, which is here called a CAN XL bus system, and/or variants of the same, as described below. Bus system 1 may be used in a vehicle, in particular a motor vehicle, in an aircraft etc., or in a hospital etc.

In FIG. 1, bus system 1 has a plurality of subscriber stations 10, 20, 30, which are respectively connected to a bus 40 having a first bus wire 41 and a second bus wire 42. Bus 40 is terminated on its two ends by terminal resistors 50. Bus wires 41, 42 may also be called CAN_H and CAN_L or CAN-XL_H and CAN-XL_L and are used, by the application of a TX signal in the transmission state, for electrical signal transmission after coupling in the dominant levels or generating recessive levels for a signal in the transmission state. Messages 45, 46 are serially transmittable via bus 40 in the form of signals CAN_H and CAN_L or CAN-XL_H and CAN-XL_L between the individual subscriber stations 10, 20, 30. Following the transmission of signals CAN_H and CAN_L or CAN-XL_H and CAN-XL_L on bus wires 41, 42, the signals are received by subscriber stations 10, 20, 30 as an RX signal. If an error occurs in the communication on bus 40, as illustrated by the jagged black arrow in FIG. 1, an error frame (error flag) 47 may be optionally transmitted. Subscriber stations 10, 20, 30 are for example control units, sensors, display devices, etc. of a motor vehicle.

As shown in FIG. 1, subscriber station 10 has a communication control device 11, a transmitting/receiving device 12 and a connection quality block 15. Subscriber station 20 has a communication control device 21, a transmitting/receiving device 22 and a connection quality block 25. Subscriber station 30 has a communication control device 31, a transmitting/receiving device 32 and a connection quality block 35.

Transmitting/receiving devices 12, 22, 32 of subscriber stations 10, 20, 30 are each connected directly to bus 40, even if this is not illustrated in FIG. 1.

In each subscriber station 10, 20, 30, the messages 45, 46 are exchanged encoded in the form of frames via a TXD line and an RXD line bitwise between the respective communication control device 11, 21, 31 and the associated transmitting/receiving devices 12, 22, 32.

Communication control devices 11, 21, 31 are respectively used for controlling a communication of the respective subscriber station 10, 20, 30 via bus 40 with at least one other subscriber station of the subscriber stations 10, 20, 30 that are connected to bus 40.

Communication control devices 11, 31 generate and read first messages 45, which are CAN messages for example that are constructed on the basis of a CAN XL format, which is described in more detail with reference to FIG. 2. Communication control devices 11, 31 may be additionally designed to provide, as needed, a Can XL message 45 or a CAN FD message 46 for transmitting/receiving devices 12, 32 or to receive such from the latter. Communication control devices 11, 31 thus generate and read a first message 45 or a second message 46, the first and second messages 45, 46 being differentiated by their data transmission standard, namely, in this case CAN XL or CAN FD.

Communication control device 21 may be developed like a conventional CAN controller in accordance with ISO 11898-1:2015, in particular like a CAN FD-tolerant classical CAN controller or a CAN FD controller. Communication control device 21 generates and reads second messages 46, for example classical CAN messages or CAN FD messages 46. The CAN FD messages 46 may comprise a number of 0 to 64 data bytes, which additionally are transmitted at a markedly faster data rate than in the case of a classical CAN message. In particular, except for block 25, communication control device 21 is developed like a conventional CAN or CAN FD controller.

Transmitting/receiving device 22 may be developed like a conventional CAN transceiver in accordance with ISO 11898-2:2016 or CAN FD transceiver. Transmitting/receiving devices 12, 32 may be designed to provide, as needed, messages 45 or bits of a frame in accordance with the CAN XL format or messages 46 or bits of a frame in accordance with the current CAN FD format for the associated communication control device 11, 31 or to receive such from the latter.

Using the two subscriber stations 10, 30, it is possible to generate and then transmit messages 45 in the CAN XL format and to receive such messages 45.

Figure 2:
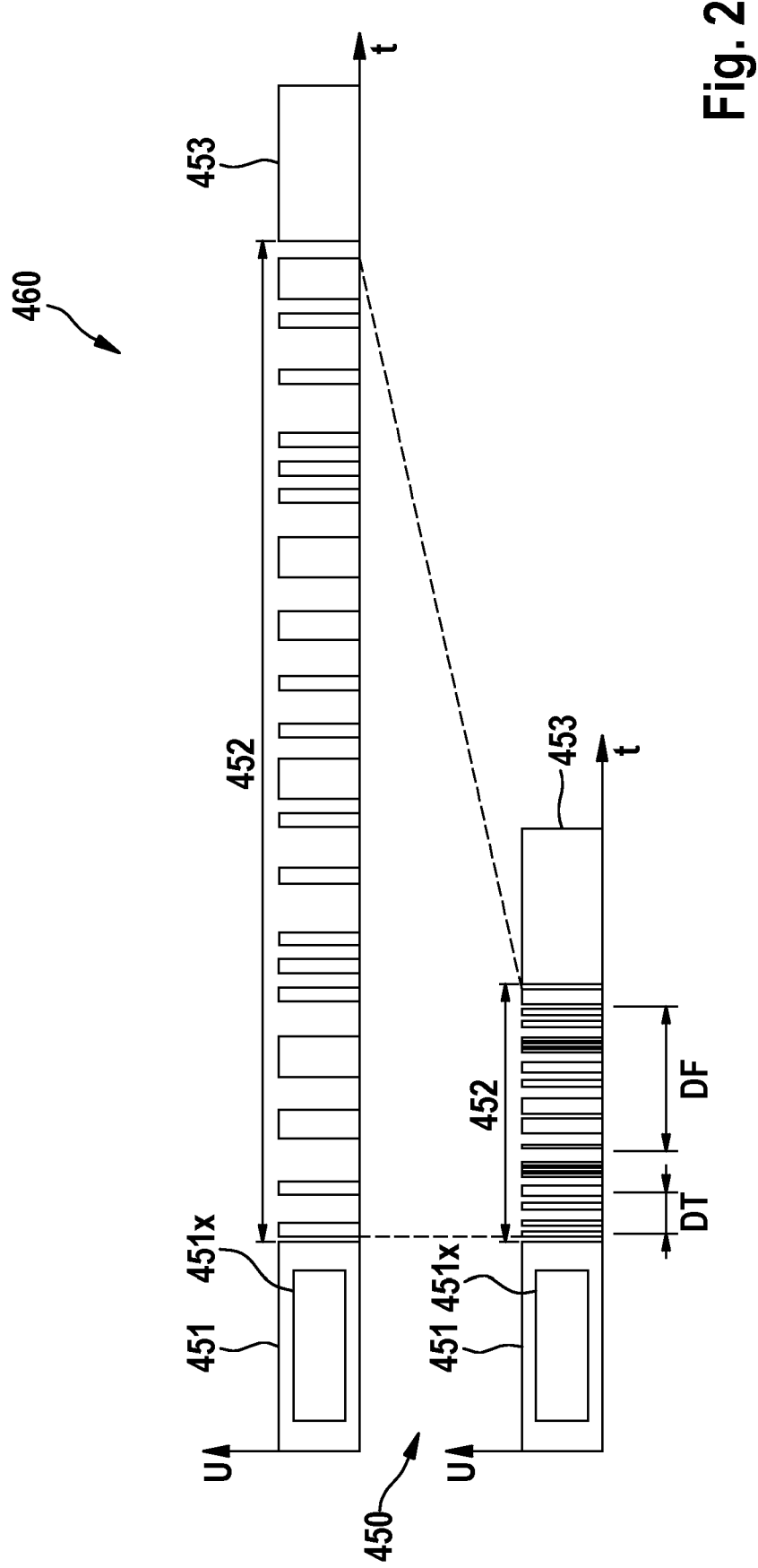
FIG. 2 shows a diagram illustrating the structure of messages that may be transmitted by subscriber stations of the bus system according to the first exemplary embodiment.

FIG. 2 shows in its upper section for message 46 a CAN FD frame 460, as it is transmitted serially on bus 40 by transmitting/receiving device 12 or transmitting/receiving device 22 or transmitting/receiving device 32 over time t. The lower section of FIG. 2 shows for message 45 a special example of a CAN XL frame 450, as it may be transmitted serially on bus 40 by transmitting/receiving device 22 or 32 over time t. Alternatively, the upper section of FIG. 2 may be interpreted as a classical CAN frame and the lower section of FIG. 2 may be interpreted as a CAN FD frame or CAN XL frame.

According to FIG. 2, for the CAN communication on bus 40, frames 450, 460 are partitioned into different communication phases 451, 452, 453, namely, an arbitration phase 451, a data phase 452, and an end of frame phase 453. In the arbitration phase 451 at the start of frame 450, 460, the associated transmitting/receiving device 12, 22, 32 transmits an identifier 451x and a portion of a control field. In the data phase 452, the following data are transmitted inter alia: a portion of the control field, the user data of the CAN XL frame or of message 45, 46 in a data field DF and a checksum. In a frame 450, a portion of the control field may be an optional DataType field DT, which indicates the type of data that are transmitted in data field DF. For illustrative purposes, DataType field DT is shown in FIG. 2 having a greater length than it often has in relation to the length of the data field DF. DataType field DT may be transmitted in the control portion of the frame 450, 460, in particular at the start of data phase 452, or at the end of arbitration phase 451. Data phase 452 is followed by the end of frame phase 453, which also belongs to the arbitration phase according to ISO11898-1:2015. End of frame phase 453, which may also be referred to as the arbitration phase at the end of frame 450, 460, has inter alia the following portions: an ACK field and an end of frame (EOF) indicator. The end of frame phase 453 is not relevant in this context and is therefore not described in more detail.

In the arbitration phase 451, the associated transmitting/receiving device 12, 22, 32 transmits bits of frame 450, 460 at a slower bit rate than in the data phase 452. In the case of CAN FD, the data phase 452 is temporally markedly shorter than the data phase 452 of the classical CAN frame. In particular application cases, the two bit rates of phases 451, 452 may be configured to the same values, but usually the bit rate in the data phase 452 is considerably higher than in the arbitration phase 451.

For CAN XL, a frame format is defined, in which not only the bit rates within frame 450 or message 45 are switched over, but optionally also the operating mode of transmitting/receiving device 12, 32. In the arbitration phase 451, transmitting/receiving device 12, 32 works in an operating mode (here called CAN) that is compatible to ISO 11898-2:2016. In the data phase 452 of frame 450, transmitting/receiving device 12, 32 may be optionally switched into another operating mode that allows for higher bit rates and thus a fast data transmission.

The arbitration phase 451 is used to negotiate with the aid of an identifier (ID) 451x bitwise between subscriber stations 10, 20, 30 to determine which subscriber station 10, 20, 30 has the message 45, 46 with the highest priority and hence for the time being receives exclusive access to bus 40 of bus system 100 for transmitting at least in the subsequent data phase 452. For this purpose, the conventional CSMA/CR method is applied in the arbitration phase 451, which allows for simultaneous access of subscriber stations 10, 20, 30 to bus 40, without the higher prioritized message 45, 46 being destroyed. This makes it possible in a relatively simple manner to add further bus subscriber stations 10, 20, 30 to bus system 100, which is very advantageous.

In the arbitration phase 451, the associated transmitting/receiving device 12, 22, 32 thus uses a physical layer as in the case of CAN and CAN FD. The physical layer corresponds to the bit transmission layer or layer 1 of the conventional OSI model (open systems interconnection model).

The CSMA/CR method has the consequence that there must be so-called recessive states on bus 40, which may be overwritten by other subscriber stations 10, 20, 30 having dominant states on bus 40. In the recessive state, highly resistive conditions prevail at the individual subscriber stations 10, 20, 30, which in combination with the parasites of the bus circuit entail longer time constants. This results in a limitation of the maximum bit rate of today's CAN FD physical layer to currently approximately 2 megabits per second in real vehicle usage.

A transmitter of message 45, 46 starts a transmission of bits of data phase 452 on bus 40 only when the corresponding subscriber station 10, 20, 30 as the transmitter won the arbitration and subscriber station 10, 20, 30 as transmitter thus has exclusive access to bus 40 of bus system 100 for transmitting.

Quite generally, in the bus system using CAN XL, the following deviating properties may be implemented in comparison to CAN or CAN FD:

a) take-over and, if indicated, adaptation of proven properties that are responsible for the robustness and user-friendliness of CAN and CAN FD, in particular the frame structure with identifier 451x and arbitration in accordance with the CSMA/CR method,
b) increase of the net data transmission rate, in particular to approximately 10 megabits per second or more,
c) increase of the size of the user data per frame, in particular to approximately 2 kbyte or more.

Figure 3:
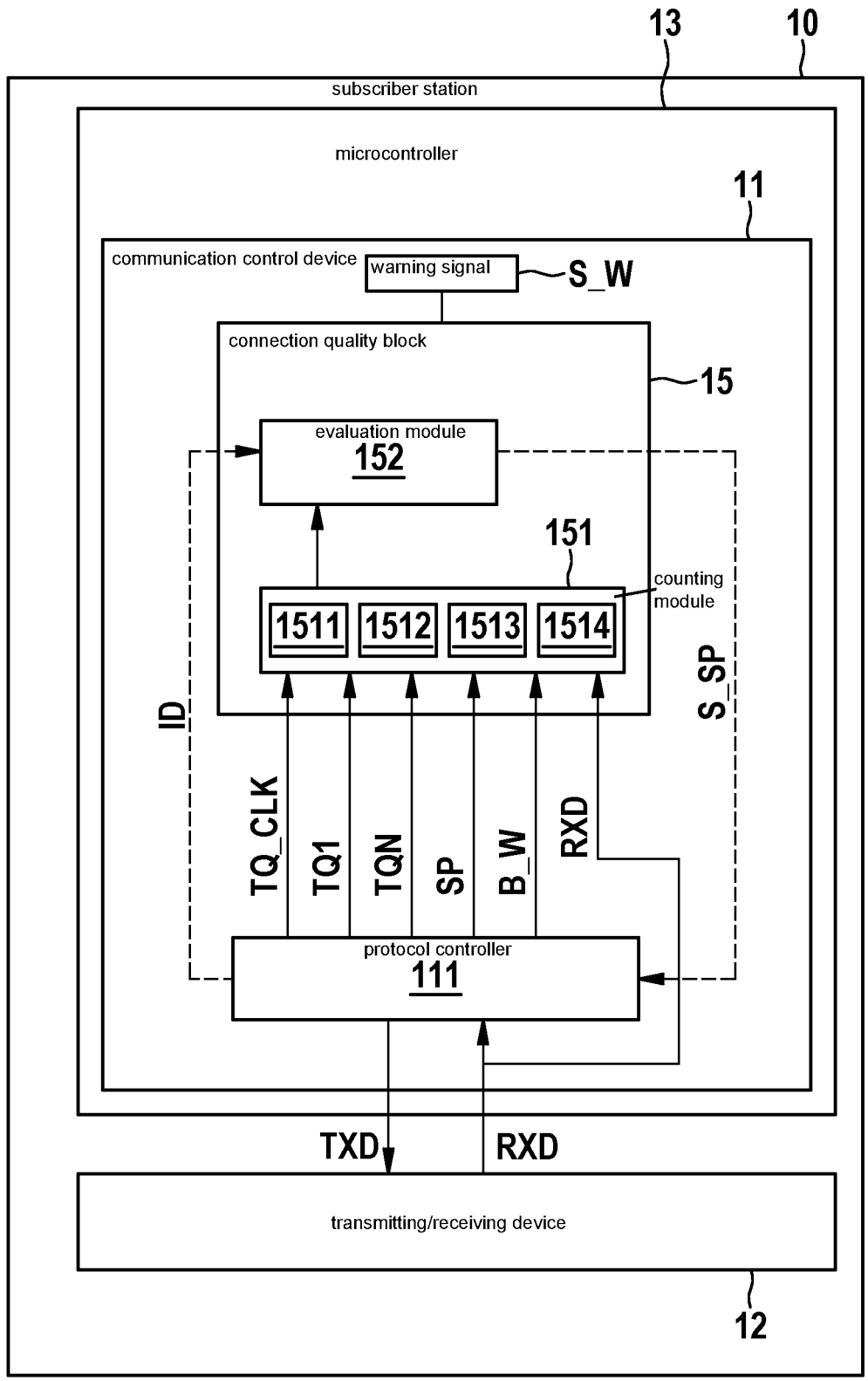
FIG. 3 shows a simplified block diagram of a subscriber station of the bus system according to a first exemplary embodiment.

FIG. 3 illustrates the structure of communication control device 11 in more detail. Optionally, at least one of the communication control devices 21, 31 may be developed in the same manner. Hence, the following description of communication control device 11 applies in the same way to communication control devices 21, 31 and their blocks 25, 35.

According to FIG. 3, subscriber station 10 has, in addition to communication control device 11 and transmitting/receiving device 12, a microcontroller 13, to which communication control device 11 is assigned. Communication control device 11 has a TXD terminal for outputting the TXD transmission signal and an RXD terminal for receiving the RXD signal from the associated transmitting/receiving device 12. Furthermore, communication control device 11 has a protocol controller 111 and the connection quality block 15, which detects the connection quality and provides it to microcontroller 13. Microcontroller 13 typically contains also a central processing unit (CPU). The connection quality block 15 is thus provided in communication control device 11 in addition to the protocol controller 111. Protocol controller 111 may be in particular a CAN protocol controller.

The connection quality block 15 has a counting module 151 and an evaluation module 152. Counting module 151 has a first through fourth counter 1511 through 1514.

In the operation of subscriber station 10, protocol controller 111 provides the following information to connection quality block 15, which will be described in more detail below with reference to FIGS. 4 through 10: first time quantum TQ1 of the bit, last time quantum TQN of the bit, sample point SP, time quantum clock pulse TQ_CLK and value B_W of the bit that was sampled by protocol controller 111 at sample point SP. All of the aforementioned items of information about time quanta TQ are properties of the time quanta. This makes the implementation of the counting process using counting module 151 very simple. This is described in more detail below with reference to FIGS. 4 through 10.

FIG. 4 shows over time t the subdivision of a bit time T_B into a plurality of time quanta TQ. The bit time T_B is the time duration of a bit in the respective present communication phase, that is, either arbitration phase 451 or data phase 452. A bit is expected at a specific position in a signal received from bus 40. Every bit is composed of the same number of time quanta TQ. The number of time quanta TQ may be chosen arbitrarily. In the example of FIG. 4, 16 time quanta TQ exist in one bit time T_B.

According to FIG. 4, the bit time T_B begins with the first time quantum TQ1. The protocol controller 111 expects the edge change of the bit in the first time quantum TQ1. The protocol controller 111 samples the value of the bit at a sample point SP. In the example of FIG. 4, the sample point SP is situated at the end of the 12th time quantum TQ of the bit time T_B.

The number of time quanta TQ per bit and/or the position of the sample point SP are/is adjustable in the communication control device 11, 21, 31. Protocol controller 111 is able to adapt the number of time quanta TQ per bit dynamically when receiving, in order to synchronize to the received bit sequence at the RXD terminal.

FIGS. 5 through 9 show different scenarios, which may occur for a receiving subscriber station 10, 20, 30 in the operation of bus system 1 when receiving a bit sequence 010 from bus 40. In the example of FIGS. 4 through 9, only the middle bit, that is, the 1, will be considered in more detail below.

FIG. 5 shows an ideal signal pattern RXD_A for bit sequence 010. In practice, such an ideal signal pattern RXD_A occurs seldom, however.

FIG. 6 shows a signal pattern RXD_B with bit asymmetry, which in this manner typically occurs in the data phase 452 in CAN FD.

FIG. 7 shows a signal pattern RXD_C with strong bit asymmetry. This corresponds to a poor connection quality, in which communication is still possible without error, however.

FIG. 8 shows a signal pattern RXD_D with double-switchover. Such a signal pattern RXD_D occurs when bus 40 is not terminated correctly. In such a case, reflections result and thus oscillations of the bus signal on CAN bus 40. The oscillations then result in so-called double-switchovers, as shown in FIG. 8, or multi-switchovers. The signal pattern RXD_D in FIG. 8 also corresponds to a poor connection quality, for e.g. one of the terminal resistors (termination) 50 from FIG. 1 is no longer connected to bus 40.

FIG. 9 shows a signal pattern RXD_E with such a great bit asymmetry that a sampling failure results. At sample point SP, the bit is sampled as 0 instead of 1. Since such a signal pattern RXD_E results in a bit error, signal pattern RXD_E corresponds to a very poor connection quality. This case is also detectable via error counters, which may be provided in the subscriber stations 10, 20, 30.

To detect the connection quality, communication control device 11, or, more precisely, its connection quality block 15, proceeds as illustrated in FIG. 10 on the basis of signal pattern RXD_C from FIG. 7 and described below.

According to the example from FIG. 10, connection quality block 15 is designed to detect the bit asymmetry of a bit in reception signal RXD with the aid of counters 1511 through 1514. From the bit asymmetry, which may be output by counting module 151 as a signal to evaluation module 152, as indicated by the arrow in FIG. 3, the evaluation module 152 is then able to derive the connection quality. Thus, in a first step, the bit asymmetry of a bit is detected and in a second step the connection quality is derived from the result of the detection.

For this purpose, in a first partial bit time T1, which corresponds to the duration from the first time quantum TQ1 to the sample point SP, connection quality block 15 uses the counters 1511, 1512. In the second partial bit time T2, which corresponds to the period from the sample point SP to the last time quantum TQN, connection quality block 15 uses the counters 1513, 1514.

The first counter 1511 counts during time period T1 at each time t_Z, the times t_Z being illustrated in FIG. 10 by the vertically downward pointing arrows, in how many time quanta TQ the value of the RXD signal is 0. The second counter 1512 counts during time period T1 at each time t_Z, in how many time quanta TQ the value of the RXD signal is 1.

The third counter 1513 counts during time period T2 at each time t_Z, in how many time quanta TQ the value of the RXD signal is 0. The fourth counter 1514 counts during time period T2 at each time t_Z, in how many time quanta TQ the value of the RXD signal is 1.

In the example of FIG. 10, the following counts result at the end of the considered bit:
count value of first counter 1511=7
count value of second counter 1512=5
count value of third counter 1513=3
count value of fourth counter 1514=1

Subsequently, connection quality block 15 selects two counters of the counters 1511 through 1514 as a function of the bit value B_W, which protocol controller 111 ascertained for this bit. As already mentioned, in the present implementation, protocol controller 111 takes over the value of the bits at sample point SP. If the bit value B_W=0, then connection quality block 15 selects the counters 1511, 1513. If the bit value B_W=1, then connection quality block 15 selects the counters 1512, 1514.

In the example of FIG. 10, the bit value B_W sampled by protocol controller 111 is 1. In the example of FIG. 10, connection quality block 15 therefore selects counters 1512, 1514. The count value of counter 1512 corresponds to a time reserve M1, which exists prior to sample point SP or between the edge change of the bit and sample point SP. The count value of counter 1514 corresponds to a time reserve M2, which exists subsequent to sample point SP or between the sample point SP and the edge change of the bit. Time reserves M1, M2 may also be called margins M1, M2.

Time reserves M1, M2 are detected for each bit in a frame 450, 460. Alternatively, it is possible to detect the time reserves M1, M2 only for dedicated bits.

The detection of time reserves M1, M2 occurs with a small error, the so-called quantization error, because the RXD signal is sampled only once per time quantum TQ. This is no disadvantage, however, because protocol controller 111 also operates only with time quantum clock pulse TQ_CLK.

The evaluation of time reserves M1, M2 occurs according to the rule that the smaller time reserves M1, M2 are, the poorer is the connection quality. If time reserves M1, M2 lie below a predetermined limit count value, then a warning signal S_W, in particular an interrupt, may be triggered, in order to inform regarding the poor connection quality. In addition, the evaluation of time reserves M1, M2 and thus the ascertained connection quality may be stored in a memory of block 15 or microcontroller 13.

Evaluation module 152 may ascertain the shortest time reserves M1, M2 per frame 450, 460 and provide these to microcontroller 13 in subscriber station 10 by register or memory entry. For example, the predetermined warning threshold for time reserves M1, M2 may be 2 respectively. In the previously described example, time reserve M2 falls below the limit count value of 2, since time reserve M2 has the value 1. Thus, in this case, warning signal S_W would be output.

Optionally, it is possible first to check the plausibility of a detection of the time reserves M1, M2, before triggering the warning signal S_W, for example an interrupt. In the plausibility check, a value for the time reserves M1, M2, which falls below the predetermined limit count value or the predetermined warning threshold, must occur N times, before the value triggers the warning signal S_W, for example an interrupt.

Optionally, it is additionally possible to store in subscriber station 10 a measured value of the shortest time reserves M1, M2 for the 1 bits and a measured value of the shortest time reserves M1, M2 for the 0 bits.

According to a first modification, evaluation module 152 assigns the detection of time reserves M1, M2 to individual transmitting subscriber stations 10, 20, 30 of bus system 1 on the basis of IDs in frames 450, 460, such as for example the identifier 451*x* of frames 450, 460, or an ID in data field 452, etc.

In CAN, the individual transmitting subscriber stations 10, 20, 30 of bus system 1 may be identified with the aid of the frame ID or the identifier 451*x* of frames 450, 460. If the measurement of the connection quality is performed per transmitting subscriber station 10, 20, 30 or even per frame ID used in frames 450, 460, this may be utilized in the error search or when reporting or outputting warning signal S_W. Consequently, connection quality block 15 in subscriber station 10 for example may report to the software: The bits in the frame having the ID=0x31F or of subscriber station 30 fall below the limit count value or the warning threshold in the connection quality.

In particular, the connection quality of the frames 450, 460 transmitted by the subscriber station 10, 20, 30 itself may be detected separately and then stored.

According to the first modification in the present exemplary embodiment, a subscriber station 10, 20, 30, instead of merely detecting a bit asymmetry (time reserves M1, M2) in the received RXD signal, is thus also able to detect a bit asymmetry in the received RXD signal per transmitting subscriber station 10, 20, 30 and to provide it to microcontroller 13. In this manner, a user is able to see what the connection quality is like to the individual subscriber stations 10, 20, 30 in bus system 1. This helps in the diagnosis of the connection quality in bus system 1.

According to a second modification, evaluation module 152 responds with a signal S_SP in order to adapt the position of sample point SP in the bit as a function of a detected time reserve M1 that is too small or a detected time reserve M2 that is too small. These two values for time reserves M1, M2 correspond to the stable range of a bit around sample point SP. If time reserves M1, M2 are not of equal magnitude, then sample point SP is not in an optimal position. In this case, evaluation module 152 is able to instruct protocol controller 111 using signal S_SP to adapt the position of sample point SP in such a way that the time reserves M1, M2 are of equal magnitude.

This adaptation of sample point SP may be performed in the receiving subscriber station 10, 20, 30 for example per transmitting subscriber station 10, 20, 30. In other words, the adaptation of sample point SP may be performed individually for every communication relation in bus system 1. The transmitting subscriber station 10, 20, 30 may be identified using the frame ID or the identifier 451*x* of frames 450, 460, as previously described with regard to the first modification of the present exemplary embodiment. Since the bit asymmetry is different in each communication relation, that is, per transmitting subscriber station 10, 20, 30, a different sample point SP is to be set in the receiving subscriber station 10, 20, 30 for every transmitting subscriber station 10, 20, 30.

With the adaptation of sample point SP, an optimization of the connection quality may be performed with the aid of the asymmetry detection of a received bit of the RXD signal.

According to a third modification, protocol controller 111 provides the information as to whether the currently received bit is a bit of the arbitration phase 451 or a bit of the data phase 452. The bits of frame end phase 453 are transmitted with the same bit time T_B as the bits of arbitration phase 451. Since a bit of arbitration phase 451 is normally longer than a bit of data phase 452, a bit asymmetry in a bit of data phase 452 normally results with greater probability in an error than in a bit of the arbitrations phase 451. Accordingly, evaluation module 152 is able to include the information with regard to the present occurrence of the arbitration phase 451 or of the data phase 452 in order to evaluate the detected time reserves M1, M2 and thus the connection quality. In particular, the evaluation module 152 is able to detect separate time reserves M1, M2 for the arbitration phase 451 and the data phase 452. Depending on the evaluation, evaluation module 152 adapts the output of warning signal S_W accordingly.

Figure 11:
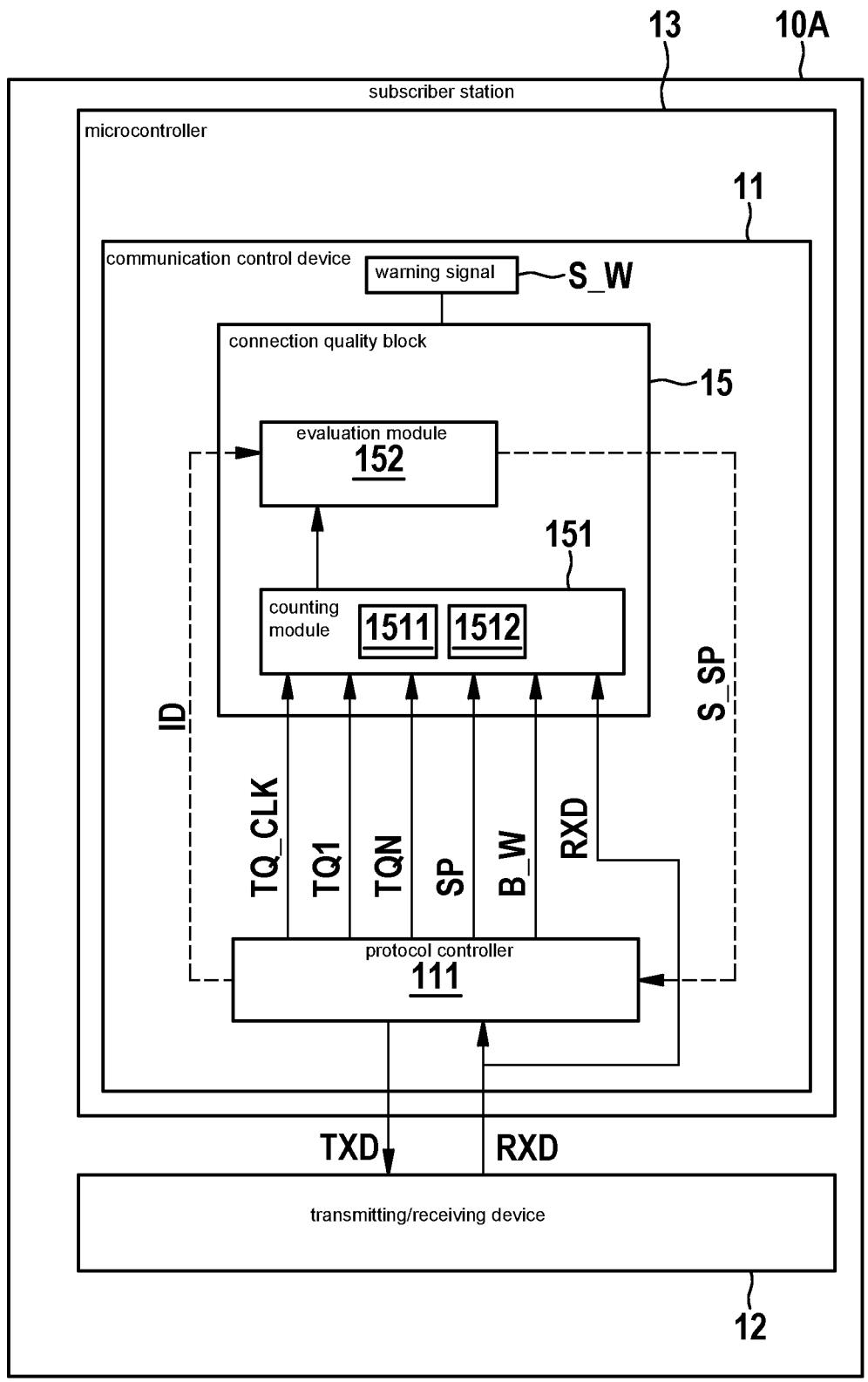
FIGS. 11 through 14 respectively show a simplified block diagram of a subscriber station of a bus system according to a second through fifth exemplary embodiment.

FIG. 11 shows the structure of a subscriber station 10A according to a second exemplary embodiment.

In contrast to subscriber station 10 according to the preceding exemplary embodiment, subscriber station 10A according to the present exemplary embodiment has only two counters 1511, 1512 in its counting module 151.

In the present exemplary embodiment, time reserves M1, M2 are therefore not measured individually as in the preceding exemplary embodiment. Instead, in the present exemplary embodiment, counters 1511, 1512 are used to measure in how many time quanta TQ during the entire bit the RXD signal has the value 0 and in how many time quanta TQ during the entire bit the RXD signal has the value 1.

Counters 1511, 1512 have for example the following counts at the end of the considered bit:

count value of first counter 1511=10
count value of second counter 1512=6

Subsequently, connection quality block 15 selects one counter of the counters 1511, 1512 as a function of the bit value, which protocol controller 111 ascertained for this bit. If the bit value=0, then connection quality block 15 in the previous example selects counter 1511. If the bit value=1, then connection quality block 15 in the previous example selects counter 1512. Then it is possible, as in the previous exemplary embodiment, to define thresholds or limit count values and to detect the poorest detection value per frame 450, 460 and/or per transmitting subscriber station 10, 20, 30, or per bus 40 or bus system 1.

The variant according to the present exemplary embodiment is more simple in its implementation due to the smaller number of counters 1512, 1522 than in the previous exemplary embodiment. Due to the smaller number of counters 1512, 1522, however, the variant according to the present exemplary embodiment is somewhat less meaningful than the variant according to the previous exemplary embodiment.

Otherwise, the subscriber station 10A according to the present exemplary embodiment is constructed in the same manner as subscriber station 10 according to the previous exemplary embodiment.

All of the modifications of the previous exemplary embodiment are also applicable to the subscriber station 10A according to the present exemplary embodiment.

Additionally, is it possible in a modification to use two counters 1511, 1512 for a bit value, for example the bit value=0, and to use only one counter 1513 for the other bit value, in this example the bit value=1. It is thus possible to combine the manners of counting of the first and second exemplary embodiments.

Figure 12:
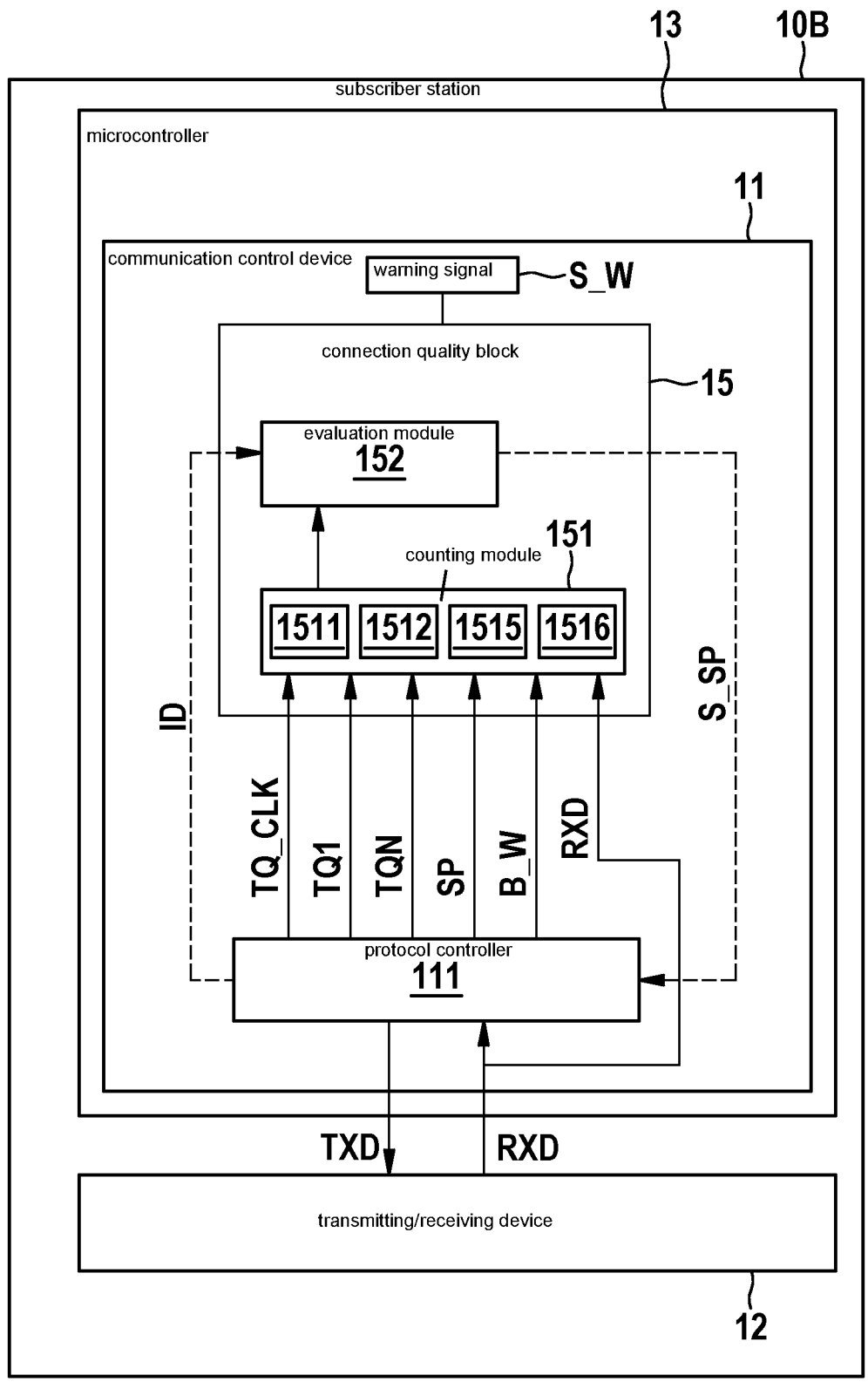

FIG. 12 shows the structure of a subscriber station 10B according to a third exemplary embodiment.

In contrast to subscriber station 10A according to the previous exemplary embodiment, subscriber station 10B according to the present exemplary embodiment has additionally a counter 1515 in its counting module 151 for counting the edges on the RXD signal prior to sample point SP. Furthermore, subscriber station 10B according to the present exemplary embodiment has additionally a counter 1516 in its counting module 151 for counting the edges on the RXD signal after sample point SP.

If counter 1515 detects and counts a number of 0 or 1 edges on the RXD signal prior to sample point SP, evaluation module 152 judges this as "in order". If counter 1516 detects and counts a number of 0 or 1 edges on the RXD signal after sample point SP, evaluation module 152 judges this as "in order".

If the count value of one of the counters 1515, 1516 is higher than 1, however, counters 1515, 1516 counted a double-switchover or multi-switchover during a bit, as was already explained previously with reference to FIG. 8. A count value of 2 for counters 1515, 1516 indicates a poor connection quality.

As a rule, every double-switchover already signifies a massive problem. Thus it is possible to set a threshold value or a predetermined limit count value of 1 in a fixed manner, so that at most 1 edge is allowed prior to or after sample point SP. Of course, the threshold value or the predetermined limit count value may also be set to a value higher than 1.

Thus, double-switchovers or multi-switchovers are also detected by digital edge detection of a bit in the RXD signal. By detecting double-switchovers or multi-switchovers, the detection and evaluation of the connection quality is further refined and improved.

It is possible, of course, to use counters 1515, 1516 and the previously described evaluation of their count value additionally in the subscriber station 10 according to the first exemplary embodiment or one of its modifications.

Figure 13:
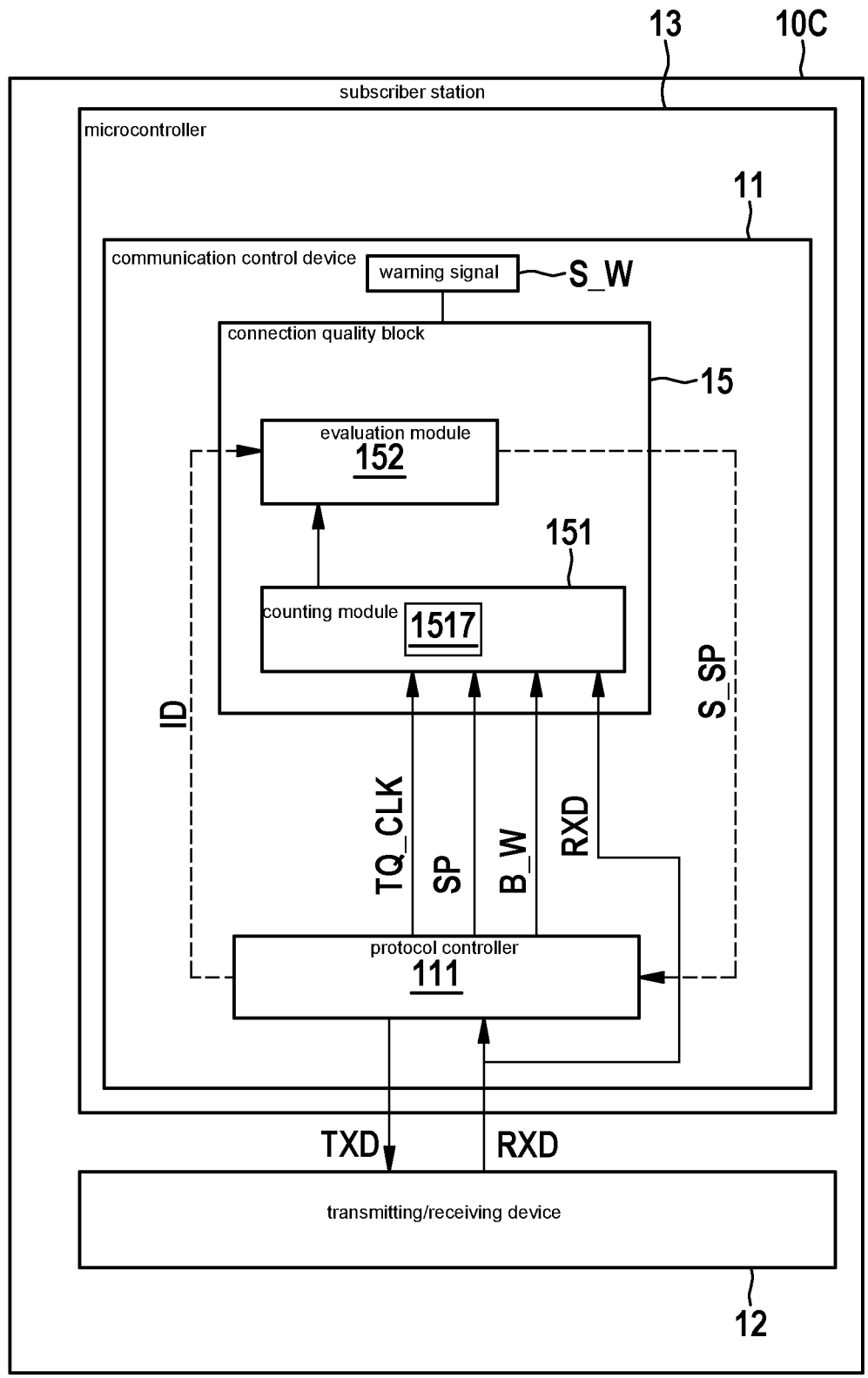

FIG. 13 shows the structure of a subscriber station 10C according to a fourth exemplary embodiment.

In contrast to subscriber stations 10, 10A, 10B according to the previous exemplary embodiments, subscriber station 10C according to the present exemplary embodiment has only one counter 1517 in its counting module 151 for counting the time quanta TQ between two edges in the RXD signal.

In this case, connection quality block 15 does not require the information about the beginning and the end of a bit from protocol controller 111. It suffices if protocol controller 111 instead only passes on the information about the number of elapsed bits in the received RXD signal to connection quality block 15. This occurs for example via signal SP, which becomes active once in each bit. Count module 151 thus knows the number of elapsed bits.

This kind of measurement or detection of the connection quality is more simple to implement than the measurement or detection of the connection quality in the previous exemplary embodiments. The measurement or detection of the connection quality, however, is less meaningful than in the previous exemplary embodiments, since the position of sample point SP is not taken into account. As a result, in such a measurement or detection of the connection quality, the phase error of the receiving subscriber station 10C is implicitly also disregarded. In CAN, a phase error occurs due to the inaccurate clock pulse sources.

It is possible, of course, to use counter 1517 and the previously described evaluation of its count value additionally in one of the subscriber stations 10, 10A, 10B according to the previous exemplary embodiments or their modifications.

Figure 14:
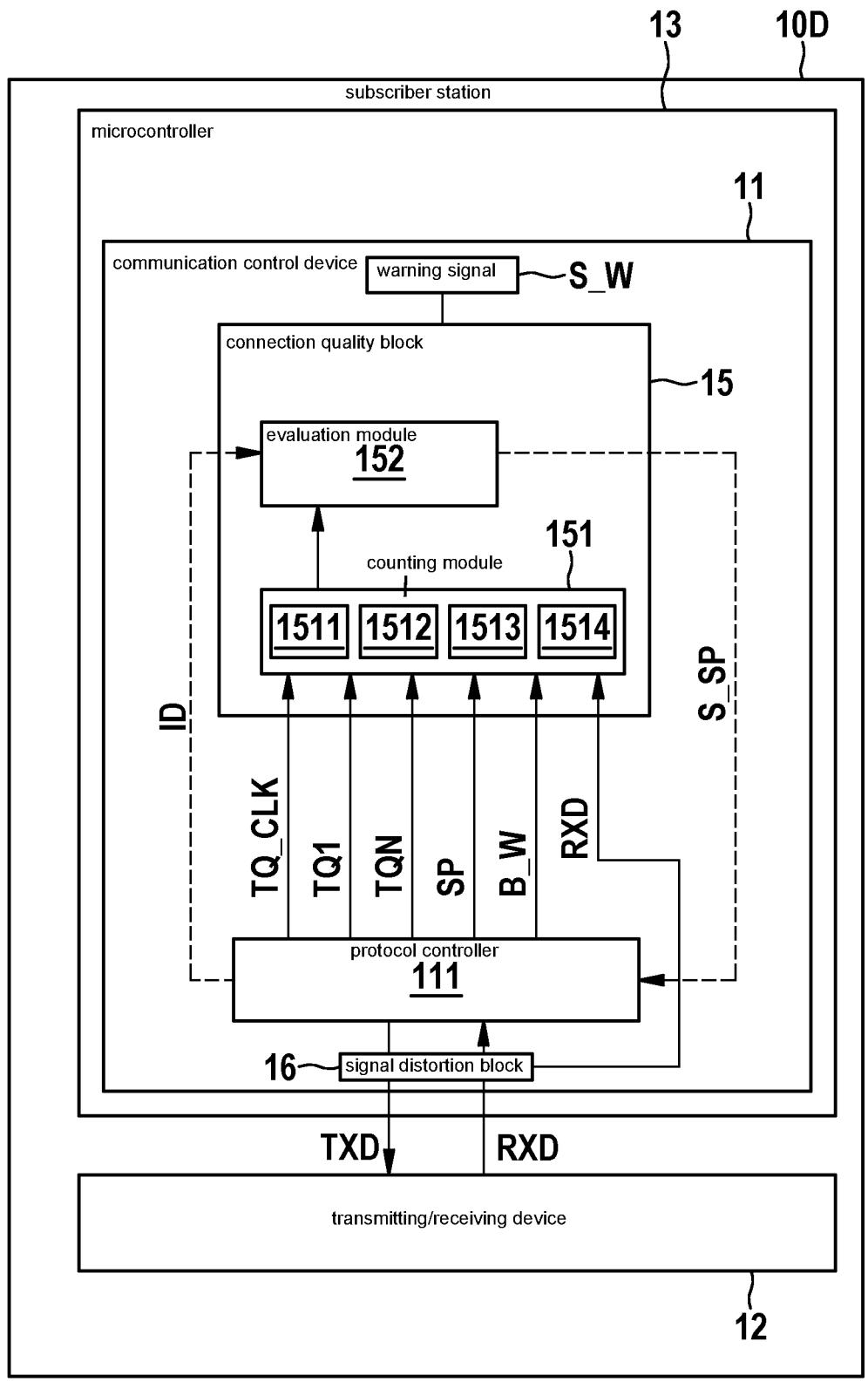

FIG. 14 shows the structure of a subscriber station 10D according to a fifth exemplary embodiment.

In contrast to subscriber station 10 according to the first exemplary embodiment, subscriber station 10D according to the present exemplary embodiment additionally has a signal distortion block 16 for the predistortion of transmission signal TXD or the TXD signal and/or for the postdistortion of reception signal RXD or the RXD signal.

To distort signals TXD, RXD, signal distortion block 16 uses the connection quality, which exists per transmitting subscriber station 10, 20, 30, 10D in accurately measured fashion. For this purpose, evaluation module 152, although this is not specifically shown in FIG. 14, is able to output a signal to signal distortion block 16.

Signal distortion block 16 distorts its own TXD signal or, more precisely, the TXD signal of its own subscriber station 10D, so that the connection quality is better for the receiver. For this purpose, signal distortion block 16 distorts the TXD signal in such a way that the bits of the TXD signal are transmitted in slightly asymmetrical fashion, so that after the transmission via bus 40 they arrive at the receiving subscriber station 10, 20, 30, 10D in more symmetrical fashion. For example, a CAN bit having the value 1 according to FIG. 4 is transmitted with a length of 17 or 18 time quanta TQ for example, instead of with a length of 16 time quanta TQ. Other values for the distortion, in particular with a length of more than 2 time quanta, are of course possible.

Additionally or alternatively, signal distortion block 16 may postdistort the RXD signal, before protocol controller 111 processes the RXD signal. For this purpose, the connection quality is detected and evaluated in a detection phase, as for example in one of the previously described exemplary embodiments. The results of the detection are used by signal distortion block 16 for postdistorting the RXD signal. Signal distortion block 16 thus ensures that the edges of the received RXD signal are shifted, in particular by 1 to 2 or more time quanta TQ. Protocol controller 111 then processes the postdistorted RXD signal, which is output by signal distortion block 16.

Since the connection quality is typically critical only in data phase 452 at the high bit rates, it suffices to perform the postdistortion only in data phase 452. Hence it is possible to receive first the frame ID or identifier 451*x*, which is transmitted in arbitration phase 451. With the frame ID or identifier 451*x*, the measure of the required postdistortion is known, for example from the last frame with this frame ID. Signal distortion block 16 is thus able to apply the required postdistortion in the data phase.

Signal distortion block 16 may be used in any of the previously described subscriber stations 10, 20, 30, 10A through 10C of bus system 1.

All the previously described developments of subscriber stations 10, 20, 30, 10A through 10D of bus system 1 and the methods carried out therein may be used individually or in all possible combinations. In particular, all features of the previously described exemplary embodiments and/or of their modifications may be combined in any manner. Additionally or alternatively, particularly the following modifications are possible.

Although the present invention was described above with reference to the example of the CAN bus system, the present invention may be used in any communication network and/or communication method. In particular, two different communication phases may be used in the communication network and/or communication method, as described above with reference to the communication phases 451, 452.

In particular, bus system 1 according to the exemplary embodiments may be a communication network, in which data are serially transmittable at two different bit rates. It is advantageous, but not an unavoidable presupposition, that in bus system 1, at least for certain time periods, exclusive, collision-free access by a subscriber station 10, 20, 30, 10A through 10D to a common channel is ensured.

The number and the arrangement of the subscriber stations 10, 20, 30, 10A through 10D in bus system 1 of the exemplary embodiments is a matter of choice. In particular, subscriber station 20 in bus system 1 may be omitted. It is possible that one or multiple subscriber stations 10 or 30 or 10A or 10B or 10C or 10D exist in bus system 1. It is possible that all subscriber stations in bus system 1 are developed identically, that is, that only subscriber stations 10 or only subscriber stations 30 or only subscriber stations 10A or 10B or 10C or 10D exist.

Blocks 15, 25, 35 are designed to be able to adjust whether the detection and then also the evaluation of the connection quality is to occur for every bit in a frame 450, 460 or only for dedicated bits. In particular, it is possible to perform the detection and also the evaluation of the connection quality for the bits of arbitration phase 451, in which case the detection and evaluation of the connection quality is not performed for the bits of data phase 452. Additionally or alternatively, it is possible for the detection and then also the evaluation of the connection quality to occur for every Nth bit of a frame, N being a natural number.

Blocks 15, 16, 25, 35 may be implemented at least partially in software.

Blocks 15, 16, 25, 35 may be switched on or switched off at any time so as to adapt to the current operating states of bus system 1. For example, the connection quality is detected and evaluated in normal operation. Blocks 15, 16, 25, 35 may be switched off, on the other hand, in a workshop when flashing new firmware versions.

What is claimed is:

1. A subscriber station for a serial bus system, comprising:
    a communication control device configured to control a communication of the subscriber station with at least one other subscriber station of the bus system;
    a transmitting/receiving device configured to receive a transmission signal generated by a communication control device of another subscriber station of the bus system in a frame from a bus of the bus system and to generate a reception signal from the received frame; and
    a connection quality block configured to detect and evaluate a quality of a communication connection to the other subscriber station of the bus system from the reception signal generated by the transmitting/receiving device by using at least two time quanta, into which a bit time of a bit of the generated reception signal is subdivided.

2. The subscriber station as recited in claim 1, wherein the connection quality block is configured to be adjustable as to whether an evaluation of a quality of a communication connection is to be performed for every bit or only for dedicated bits of the generated reception signal.

3. The subscriber station as recited in claim 1, wherein the connection quality block includes:
    a counting module having at least one counter for counting the at least two time quanta between edges of the bit or for counting time quanta of the at least two time quanta when at least one predetermined property of the time quantum exists; and
    an evaluation module configured to evaluate the quality of the communication connection based on a result of a count value of the at least one counter in comparison to at least one predetermined limit count value.

4. The subscriber station as recited in claim 3, wherein the at least one predetermined property of the time quantum includes: (i) a value of the bit in the time quantum and/or (ii) a position of the time quantum relative to a sample point of the bit and/or (iii) a number of the time quanta and/or (iii) a clock pulse of the time quanta and/or is the information that the time quantum and/or (iv) information that the time quantum is a first time quantum of the bit or a last time quantum of the bit.

5. The subscriber station as recited in claim 3, wherein the communication control device is configured to provide the at least one predetermined property of the time quantum to the connection quality block.

6. The subscriber station as recited in claim 1, wherein the connection quality block is configured to detect and evaluate a bit asymmetry of a bit of the generated reception signal by using at least one time quantum prior to a sample point of the bit and at least one time quantum after the sample point of the bit.

7. The subscriber station as recited in claim 6, wherein the connection quality block includes at least one first counter for counting at at least two points in time during a bit time, whether the bit of the reception signal has a first binary value, and at least one second counter for counting at at least two points in time during the bit time, whether the bit of the reception signal has a second binary, which is different from the first binary value, and the connection quality block is configured to evaluate the quality of the communication connection based on a result of count values of the first and second counters in comparison to at least one predetermined limit count value.

8. The subscriber station as recited in claim 6, wherein the connection quality block includes:
    a first counter configured to detect during a bit time of the bit of the reception signal at at least one point in time prior to a sample point of the bit, whether the bit has the first binary value and to count when the bit has a first binary value;
    a second counter configured to detect during the bit time of the bit of the reception signal at at least one point in time prior to the sample point of the bit, whether the bit has a second binary value, and to count when the bit has the second binary value;
    a third counter configured to detect during the bit time of the bit of the reception signal at at least one point in time after the sample point, whether the bit has the first binary value, and to count when the bit has the first binary value;
    a fourth counter configured to detect during the bit time of the bit of the reception signal at at least one point in time after the sample point, whether the bit has the second binary value, and to count when the bit has the second binary value;
    wherein the connection quality block is configured to evaluate the quality of the communication connection based on the basis a result of count values of the first, second, third, and fourth counters in comparison to at least one predetermined limit count value.

9. The subscriber station as recited in claim 6, wherein, in the case of the existence of the bit asymmetry of the bit of the generated reception signal, the connection quality block is configured to shift the position of the sample point of bits of the reception signal generated by the transmitting/receiving device in such a way that the sample point lies in ae middle between edges of the bit.

10. The subscriber station as recited in claim 1, wherein the connection quality block is configured to detect double-switchovers or multi-switchovers during a bit of the generated reception signal.

11. The subscriber station as recited in claim 1, wherein the communication control device is configured to provide an identifier of the frame to the connection quality block, and the connection quality block is configured to provide the quality of the communication connection individually for at least two subscriber stations of the bus system.

12. The subscriber station as recited in claim 1, further comprising a signal distortion block configured to predistort the transmission signal generated by the communication control device and/or to postdistort the reception signal generated by the transmitting/receiving device.

13. The subscriber station as recited in claim 1, wherein the communication control device is configured to partition the frame into a first communication phase and a second communication phase, and in the first communication phase, a negotiation takes place to determine which of subscriber station of subscriber stations of the bus is granted an at least temporarily exclusive, collision-free access to the bus in a subsequent second communication phase, and the connection quality block is configured to carry out the detection and the evaluation of the connection quality as a function of a current communication phase for the first and second communication phases.

14. A bus system, comprising:
a bus; and
at least two subscriber stations, the at least two subscriber stations being connected to one another via the bus in such a way that they are able to communicate with one another serially, where each subscriber station of the at least two subscriber stations includes:
a communication control device configured to control a communication of the subscriber station with at least one other subscriber station of the bus system,
a transmitting/receiving device configured to receive a transmission signal generated by a communication control device of another subscriber station of the bus system in a frame from a bus of the bus system and to generate a reception signal from the received frame, and
a connection quality block configured to detect and evaluate a quality of a communication connection to the other subscriber station of the bus system from the reception signal generated by the transmitting/receiving device by using at least two time quanta, into which a bit time of a bit of the generated reception signal is subdivided.

15. A method for communicating in a serial bus system, the method being carried out using a subscriber station of the bus system, which includes a communication control device and a transmitting/receiving device, the method comprising the following steps:
receiving, the transmitting/receiving device, a transmission signal generated by a communication control device of another subscriber station of the bus system, in a frame from a bus of the bus system;
generating, using the transmitting/receiving device, a reception signal from the received frame; and
detecting and evaluating, using a connection quality block, a quality of a communication connection to the other subscriber station of the bus system from the reception signal generated by the transmitting/receiving device by using at least two time quanta, into which a bit time of a bit of the generated reception signal is subdivided.

* * * * *

UNITED STATES PATENT AND TRADEMARK OFFICE
CERTIFICATE OF CORRECTION

| | |
|---|---|
| PATENT NO. | : 11,677,581 B2 |
| APPLICATION NO. | : 17/595417 |
| DATED | : June 13, 2023 |
| INVENTOR(S) | : Arthur Mutter et al. |

It is certified that error appears in the above-identified patent and that said Letters Patent is hereby corrected as shown below:

On the Title Page

In Item (86) PCT No.: PCT/EP2020/064310
§371 (c)(1), (2) Date:
"November 16, 2021"
With:
--January 6, 2022--

Signed and Sealed this
Eighth Day of August, 2023

Katherine Kelly Vidal
*Director of the United States Patent and Trademark Office*